United States Patent
Garner et al.

(10) Patent No.: US 10,486,194 B2
(45) Date of Patent: Nov. 26, 2019

(54) POST-DRAW TOWER OPTICAL FIBER COATING CURING

(71) Applicant: OFS Fitel, LLC, Norcross, GA (US)

(72) Inventors: Harry D Garner, Lawrenceville, GA (US); Douglas Edward Horgen, Atlanta, GA (US); Kariofilis Konstadinidis, Decatur, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/837,106

(22) Filed: Dec. 11, 2017

(65) Prior Publication Data

US 2019/0176189 A1   Jun. 13, 2019

(51) Int. Cl.
*B05D 3/06*      (2006.01)
*B05C 5/02*      (2006.01)
*B05D 7/00*      (2006.01)

(52) U.S. Cl.
CPC ............ *B05D 3/067* (2013.01); *B05C 5/0245* (2013.01); *B05D 7/50* (2013.01)

(58) Field of Classification Search
USPC .......................................... 118/325, 641–643
See application file for complete search history.

(56) References Cited

U.S. PATENT DOCUMENTS

| | | | | |
|---|---|---|---|---|
| 4,479,984 A | * | 10/1984 | Levy | C08F 299/026 427/163.2 |
| 2004/0067037 A1 | * | 4/2004 | Tausch | C03C 25/12 385/141 |
| 2010/0183821 A1 | * | 7/2010 | Hartsuiker | C03C 25/12 427/513 |
| 2011/0147356 A1 | * | 6/2011 | Leonhardt | H05B 3/0057 219/201 |
| 2012/0040105 A1 | * | 2/2012 | Overton | C03C 25/12 427/558 |
| 2017/0144930 A1 | * | 5/2017 | Moore | C03C 25/106 |

* cited by examiner

*Primary Examiner* — Yewebdar T Tadesse

(74) *Attorney, Agent, or Firm* — Larry Maxwell, Esq.

(57) ABSTRACT

Post-draw tower coating curing provides additional curing to an optical fiber coating after the fiber exits the bottom or output end of an optical fiber draw tower. A system may include a draw tower and a coating curing unit. The draw tower has at least one coating applicator. The coating curing unit may be located along a fiber path between the output end of the draw tower and a fiber takeup system.

9 Claims, 5 Drawing Sheets

POST-DRAW TOWER OPTICAL FIBER COATING CURING

BACKGROUND

In optical fiber manufacturing processes, fiber is drawn from a large-diameter glass structure known as a preform. The fiber is drawn through a generally vertical structure known as a draw tower. A furnace or torch may heat a portion of the preform at the top of the draw tower. Molten glass from the preform extends downwardly, forming into a fiber shape. The fiber may pass through a chiller tube filled with inert gas such as helium. The fiber cools and solidifies as it proceeds through the draw tower. Generally, the higher the speed at which the fiber is drawn, the taller the tower needs to be to sufficiently cool the fiber. One challenge in improving fiber production systems and methods is how to increase the rate of fiber production, i.e., throughput, without increasing the height of the draw tower, which may be several stories in height.

One or more coatings may be applied to the fiber in the draw tower. For example, the draw tower may include a primary coating applicator, followed by (i.e., beneath the primary coating application) a secondary coating applicator. One or more curing lamps that produce ultraviolet (UV) light may follow the coating applicators. The effectiveness of UV curing may depend on various factors, including temperature; UV curing of the primary coating is more effective when the coated fiber is cooler. The curing lamps may be, for example, broad-spectrum mercury arc lamps. In some draw towers, there may be no curing lamps between the primary and secondary coating applicators. That is, to help minimize the height of the draw tower and/or maximize draw speed, the secondary coating may be applied over the primary coating (in a "wet-on-wet" manner), and then both the primary and secondary coatings may be cured simultaneously. Curing of the primary or inner coating may be hampered by opacity of the secondary or outer coating, which is commonly tinted with a color. Higher-speed operation may exacerbate the challenge of fully curing the primary coating before the fiber exits the bottom of the draw tower.

SUMMARY

Embodiments of the invention relate to systems and methods for post-draw tower coating curing, i.e., providing additional curing to an optical fiber coating after the fiber exits the bottom or output end of a vertical optical fiber draw tower.

Embodiments of a system may include an optical fiber draw tower and a coating curing unit. The optical fiber draw tower has at least one coating applicator. The coating curing unit may be located along a fiber path between the output end of the optical fiber draw tower and an optical fiber takeup system.

Embodiments of a method for curing an optical fiber coating may include producing an optical fiber using an optical fiber draw tower, and passing the optical fiber through a coating curing unit. The optical fiber draw tower applies at least one coating. The coating curing unit may be located along a fiber path between the output end of the optical fiber draw tower and an optical fiber takeup system.

Other systems, methods, features, and advantages will be or become apparent to one of skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
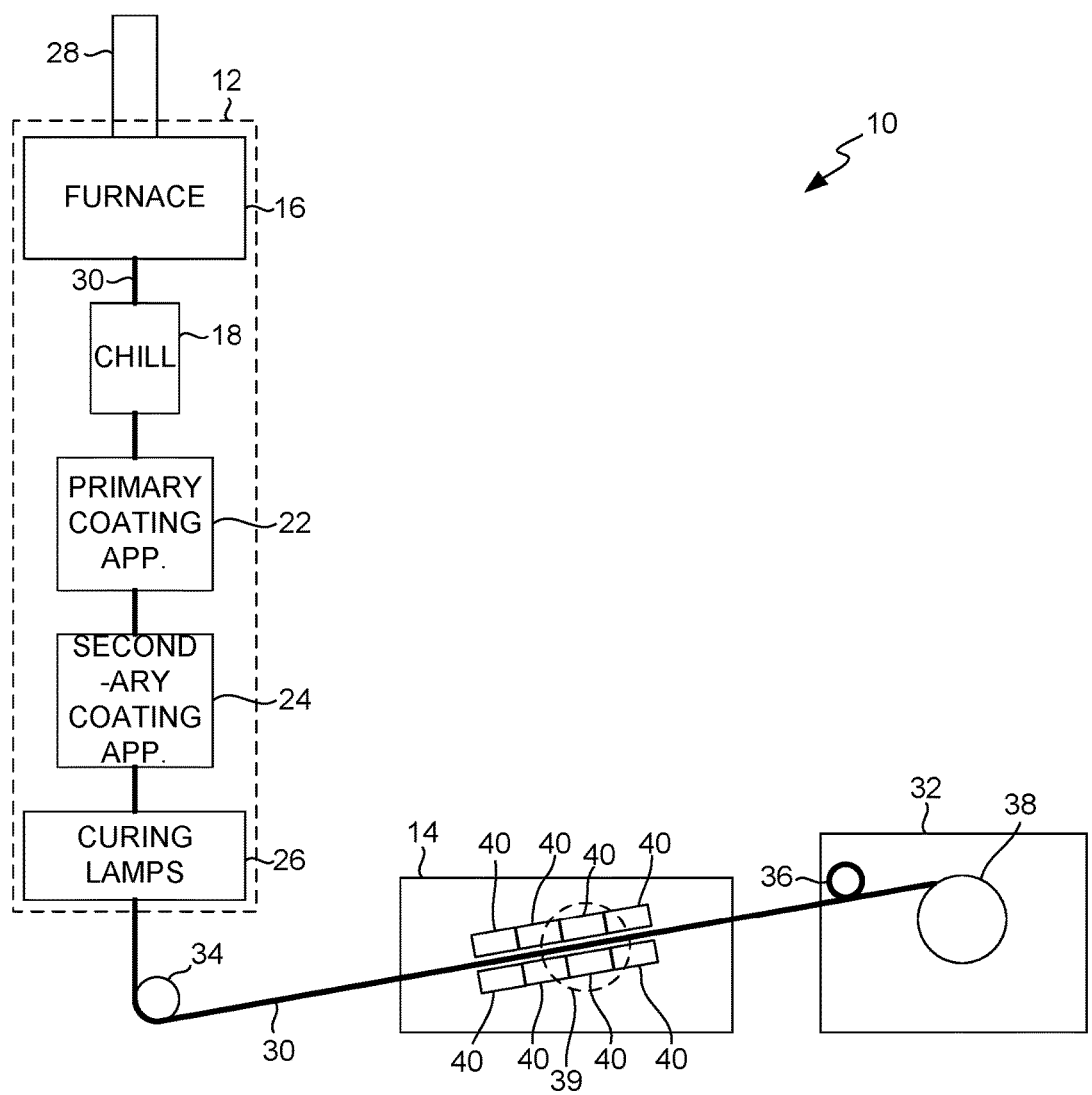
FIG. 1 is a side elevation view of a post-draw tower optical fiber coating curing system, in accordance with exemplary embodiments of the invention.

As illustrated in FIG. 1, in an illustrative or exemplary embodiment of the invention, a system 10 includes an optical fiber draw tower 12 and a coating curing unit 14. Optical fiber draw tower 12 may have a conventional structure. For example, optical fiber draw tower 12 may include a draw furnace 16, a chiller 18, a primary coating applicator 22, a secondary coating applicator 24, and a group of one or more coating curing lamps 26. Coating curing lamps 26 may be, for example, broad-spectrum arc lamps. Alternatively, another group of one or more coating curing lamps (not shown) may be included between primary coating applicator 22 and secondary coating applicator 24. Optical fiber draw tower 12 may include still other elements, which are not shown for purposes of clarity but which are well understood by one of ordinary skill in the art. Although the structure and function of optical fiber draw tower 12 are well understood by one of ordinary skill in the art, the following is a brief description of the operation of optical fiber draw tower 12.

A glass preform 28 is provided at the input end of optical fiber draw tower 12. For purposes of reference, the top portion of optical fiber draw tower 12 may be referred to as the input end, and the bottom portion of optical fiber draw tower 12 may be referred to as the output end. As optical fiber draw tower 12 is oriented vertically, and the fiber draw process proceeds from top to bottom within optical fiber draw tower 12, an element beneath another element in optical fiber draw tower 12 may be referred to for convenience as following the other element.

At the top of draw tower 12, draw furnace 16 heats a portion of glass preform 28, and the molten glass is directed downwardly to form a fiber 30. Chiller 18 aids cooling of fiber 30. Primary coating applicator 22 applies a liquid primary coating on fiber 30. Then, secondary coating applicator 24 applies a liquid secondary coating on fiber 30. This coating process is commonly referred to as "wet-on-wet" because the primary coating has not cured before the secondary coating is applied over the primary coating. Fiber 30 then proceeds through coating curing lamps 26, which expose fiber 30 and its coatings to ultraviolet (UV) radiation.

Absorption of the UV light by the primary and secondary coatings promotes curing. The wavelengths that have the greatest effect on curing of the primary coating may differ from the wavelengths that have the greatest effect on curing of the secondary coating. That is, the primary and secondary coatings may differ in their absorbance (or conversely, transmittance) of certain wavelengths. Coating curing lamps 26 may therefore emit a broad spectrum of light to promote simultaneous curing of both the primary and secondary coatings.

Following coating curing lamps 26, fiber 30 exits the bottom portion or output end of draw tower 12. A turn-around sheave 34 at the bottom of draw tower 12 redirects fiber 30 toward a takeup system 32. Fiber 30 extends along a substantially horizontal path between the output end of draw tower 12 and takeup system 32. Takeup system 32 includes a powered capstan 36 and a takeup spool 38. Capstan 36, which is rotated at a controlled speed, pulls fiber 30 from draw tower 12. Following capstan 36, fiber 30 is wound on takeup spool 38. The spacing between the output end of draw tower 12 and takeup system 32 allows fiber 30 to further cool before it is wound on takeup spool 38.

Note that fiber 30 is substantially horizontal between the output end of draw tower 12 (e.g., turn-around sheave 34) and takeup system 32, in comparison with the vertical orientation of draw tower 12 and of fiber 30 within draw tower 12. The term "substantially" horizontal as used herein means within about 45 degrees of exactly horizontal. Conventionally, the fiber path between the output end of draw tower 12 and takeup system 32 deviates only about 6-8 degrees from horizontal.

The higher the speed at which fiber 30 is drawn from draw tower 12, the less time fiber 30 and its coatings are exposed to UV light emitted by coating curing lamps 26. The effectiveness of UV curing on a portion of coating is directly related to the amount of time that portion of coating is exposed to the UV light. Also, the higher the speed at which fiber 30 is drawn from draw tower 12, the less time fiber 30 has to cool. The effectiveness of UV curing on a portion of primary coating is inversely related to the temperature of the coated fiber 30. For these reasons, the higher the speed at which fiber 30 is drawn from draw tower 12, the less fully the UV light emitted by coating curing lamps 26 is likely to cure the primary and secondary coatings. Also, the secondary coating may have a color and may therefore be more opaque than the primary coating. For this reason, the secondary coating may cure faster than the primary coating. In a conventional system employing draw tower 12, the primary coating may not be fully cured after exiting the output end of draw tower 12. In system 10, however, coating curing unit 14 provides additional (i.e., post-draw tower 12) curing to help ensure both the primary and secondary coatings are fully cured. As coating curing unit 14 is located in the space between the output end of draw tower 12 and takeup system 32, fiber 30 has additional time to cool, enhancing the effectiveness of coating curing unit 14. An enlarged portion 39 of FIG. 1 (in coating curing unit 14) is described in further detail with regard to FIG. 2.

Figure 2:
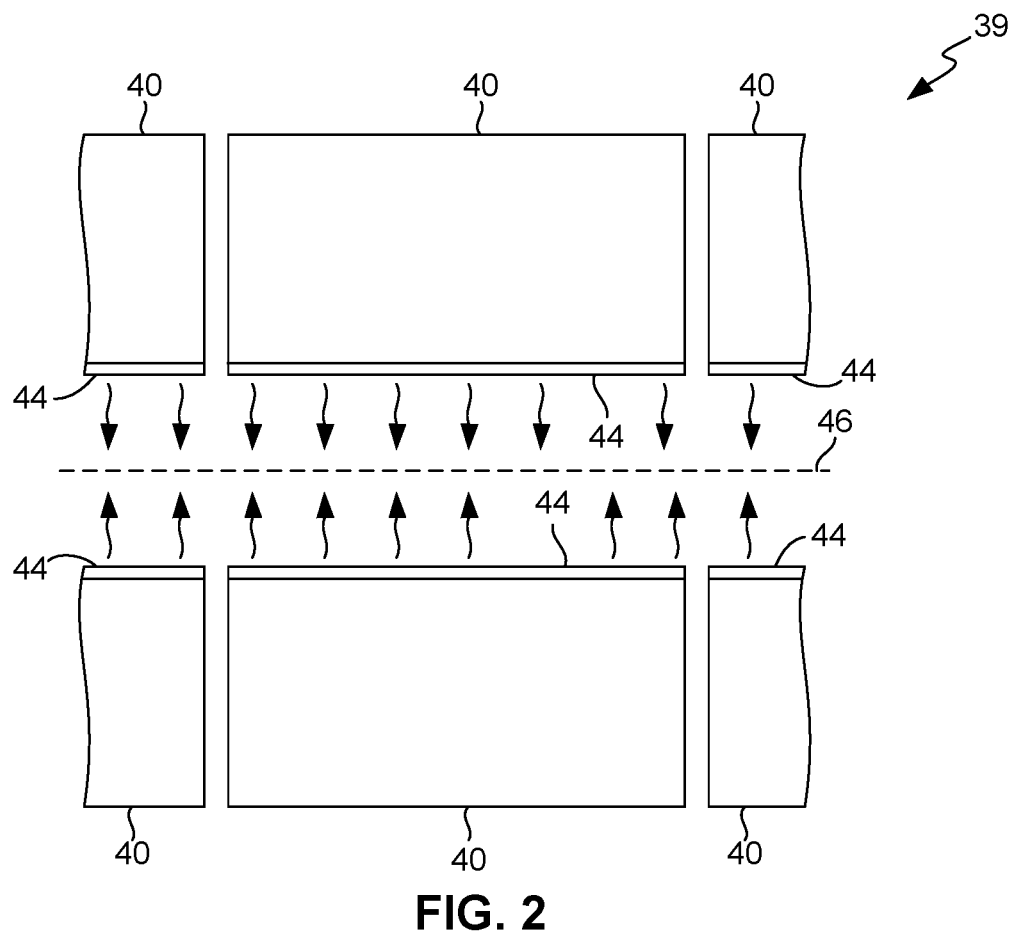
FIG. 2 is an enlargement of a portion of FIG. 1.
Figure 3:
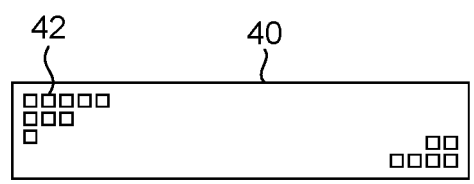
FIG. 3 is a top plan view of an exemplary one of the curing subsystems of FIGS. 1-2.

As illustrated in FIG. 2, enlarged portion 39 shows that coating curing unit 14 may include a plurality of optically self-contained LED curing subsystems 40. Suitable LED curing subsystems 40 are commercially available from various sources. An example of an LED curing subsystem 40 is the OmniCure® system available from Excelitas Technologies Corp. of Waltham, Mass. As illustrated in FIG. 3, each LED curing subsystem 40 includes one or more arrays of individual LEDs 42 mounted on a surface of a generally box-shaped housing. Each LED curing subsystem 40 may include dozens or even hundreds of individual LEDs 42 (i.e., individual LED semiconductor chips or emitters). The arrays of individual LEDs 42 are mounted behind an optical element 44 (FIG. 2), which may serve as a lens to help focus the emitted light upon a substantially linear target region or line 46. Although not shown for purposes of clarity, wires may connect each LED curing subsystem 40 to a power supply, switching device, etc. Although eight LED curing subsystems 40 are shown in FIG. 1 as an example, there may be any number of LED curing subsystems 40. Moreover, although in the exemplary embodiment the individual LEDs 42 are included in optically self-contained LED curing subsystems 40, which in turn are mounted in coating curing unit 14, in other embodiments (not shown) such individual LEDs may be provided in such a coating curing unit in any other manner, through any other type of subsystem, mount, etc.

LED curing subsystems 40 may be arranged in two rows, one on each side of line 46. Pairs of LED curing subsystems 40 may be oriented in opposition to each other along line 46. Thus, the UV light energy collectively emitted by LED curing subsystems 40 is a maximum along line 46. As described below in further detail, in operation of coating curing unit 14, line 46 is aligned with the path of fiber 30. It should be understood that FIG. 2 is not to scale, and the distance between the opposing rows of LED curing subsystems 40 may be very small. Accordingly, it may be useful to provide a manner of achieving alignment of LED curing subsystems 40 with fiber 30 in a manner that does not impede manufacturing throughput.

Figure 4:
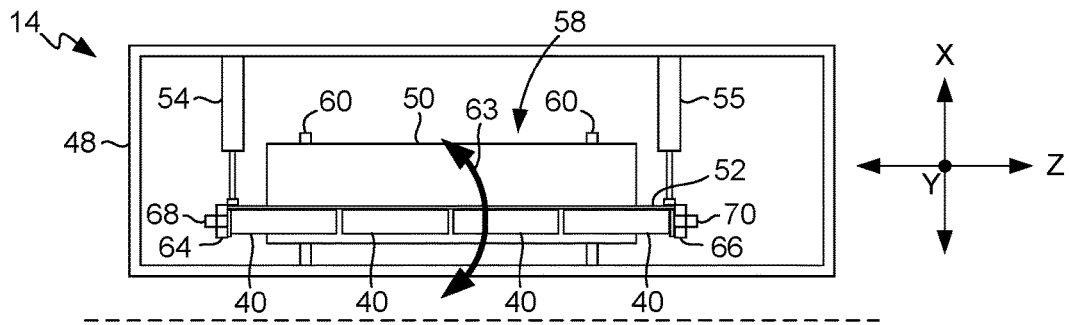
FIG. 4 is a top plan view of the coating curing unit of FIG. 1, showing the carriage portion in a retracted position, in accordance with exemplary embodiments of the invention.
Figure 5:
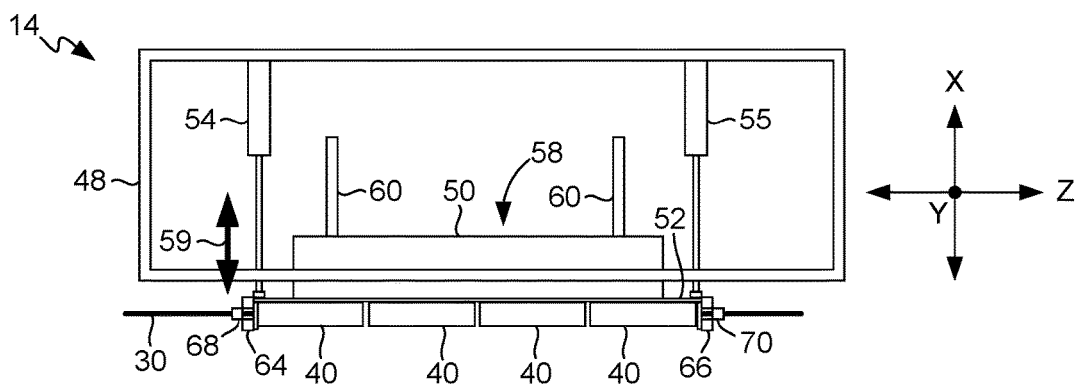
FIG. 5 is similar to FIG. 4, showing the carriage portion in an extended or deployed position.
Figure 6:
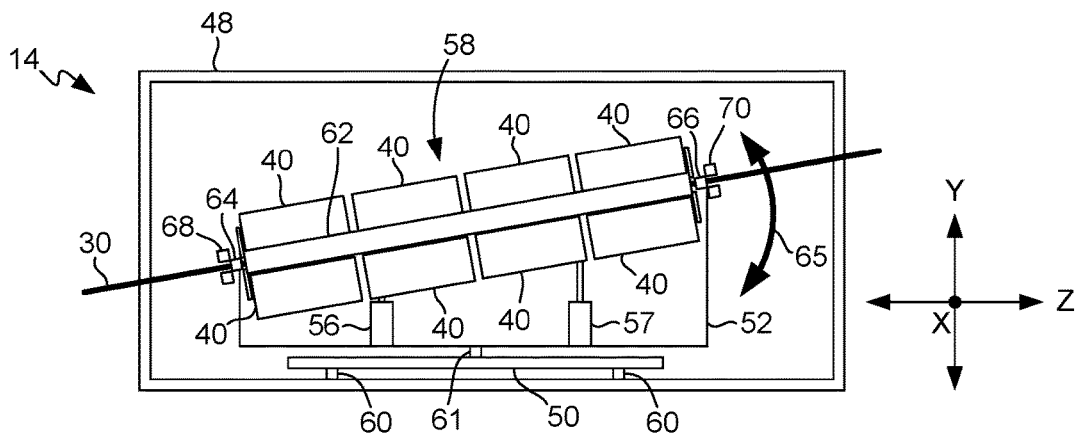
FIG. 6 is a side elevation view of the coating curing unit of FIG. 5, in accordance with exemplary embodiments of the invention.

As illustrated in FIGS. 4-6, coating curing unit 14 may include a cabinet or housing 48, a carriage 50 movably mounted with respect to housing 48, and a support structure 52 mounted on carriage 50. LED curing subsystems 40 may be mounted on support structure 52 in the orientation described above with regard to FIG. 2. Operation of coating curing unit 14 may be described in relation to a 3-axis (X, Y, Z) coordinate system, in which, for example, the Z axis is exactly horizontal and the Y axis is exactly vertical. Note in FIG. 5 that the Z axis is substantially (i.e., within about 45 degrees) parallel to fiber 30.

Coating curing unit 14 may include a plurality of actuators, such as a pair of X-axis actuators 54 and 55 (FIGS. 4-5) and a pair of Y-axis actuators 56 and 57 (FIG. 6). Carriage 50, support structure 52, and LED curing subsystems 40 may be moved together as a unit 58 from a retracted position shown in FIG. 4, in which LED curing subsystems 40 are within housing 48, to an extended or deployed position shown in FIG. 5, in which LED curing subsystems 40 are outside housing 48. In the extended or deployed position, pairs of LED curing subsystems 40 are oriented in opposition to each other on opposing sides of the path of fiber 30 as described above with regard to FIGS. 1-2. Carriage 50 may, for example, slide on rails 60 in a direction (indicated by the arrow 59 in FIG. 5) parallel to the X axis, under control of X-axis actuators 54-55.

Although not shown for purposes of clarity, X-axis actuators 54-55 may include a combination of pneumatically operated pistons for coarse positioning and electric motors for fine positioning. The X-axis actuators 54-55 may be extended in unison to move unit 58 between the retracted and extended positions. After unit 58 reaches the extended position, a guard 62 (FIG. 6) may be positioned over the path of fiber 30 to provide a safety shield for personnel against the UV light and to protect fiber 30. Although not shown for purposes of clarity, actuators 54-57 may be connected to support structure 52, LED curing subsystems 40, or unit 58 by yokes, gimbals or other connections that allow selective freedom of movement. It should be understood that the arrangement of actuators 54-57 shown in FIGS. 4-6 is only an example, and other arrangements, types of actuators, connections, etc., will readily occur to one of ordinary skill in the art in view of the teachings herein.

Support structure 52 may be mounted on carriage 50 by a swivel 61 (FIG. 6). The X-axis actuators 54-55 may be moved independently of each other to swivel support structure 52 and LED curing subsystems 40 about the axis of swivel 61 (parallel to the Y axis), as indicated by the arrow 63 in FIG. 4. Similarly, the Y-axis actuators 56-57 may be moved independently of each other to tilt support structure 52 and LED curing subsystems 40 with respect to the Z axis, as indicated by the arrow 65 in FIG. 6.

Coating curing unit 14 may include a control system that aligns LED curing subsystems 40 with the path of fiber 30. To maximize curing, the control system moves LED curing subsystems 40 into a position in which the line 46 (FIG. 2) along which the UV light energy collectively emitted by LED curing subsystems 40 is at a maximum is aligned with the path of fiber 30. The control system may include a plurality of optical sensors, such as a first X-axis sensor 64, a second X-axis sensor 66, a first Y-axis sensor 68, and a second Y-axis sensor 70. Each of sensors 64-70 may be fixedly mounted with respect to LED curing subsystems 40. For example, sensors 64-70 may be mounted to support structure 52 or other portion of unit 58. Although not separately shown for purposes of clarity, each of sensors 64-70 may have a transmitter portion (e.g., a laser) and a receiver portion (e.g., a photodiode). When line 46 (FIG. 2) is exactly aligned with fiber 30, attenuation of the signal received at the photodiode is at a maximum due to the presence of fiber 30 in the path between the laser and photodiode.

First X-axis sensor 64 and first Y-axis sensor 68 may be mounted at a first end of the rows of LED curing subsystems 40 to measure displacement of a first end of line 46 (FIG. 2) from fiber 30 in the X and Y directions, respectively. Second X-axis sensor 66 and second Y-axis sensor 70 may be mounted at a second end of the rows of LED curing subsystems 40 to measure displacement of a second end of line 46 (FIG. 2) from fiber 30 in the X and Y directions, respectively.

Figure 7:
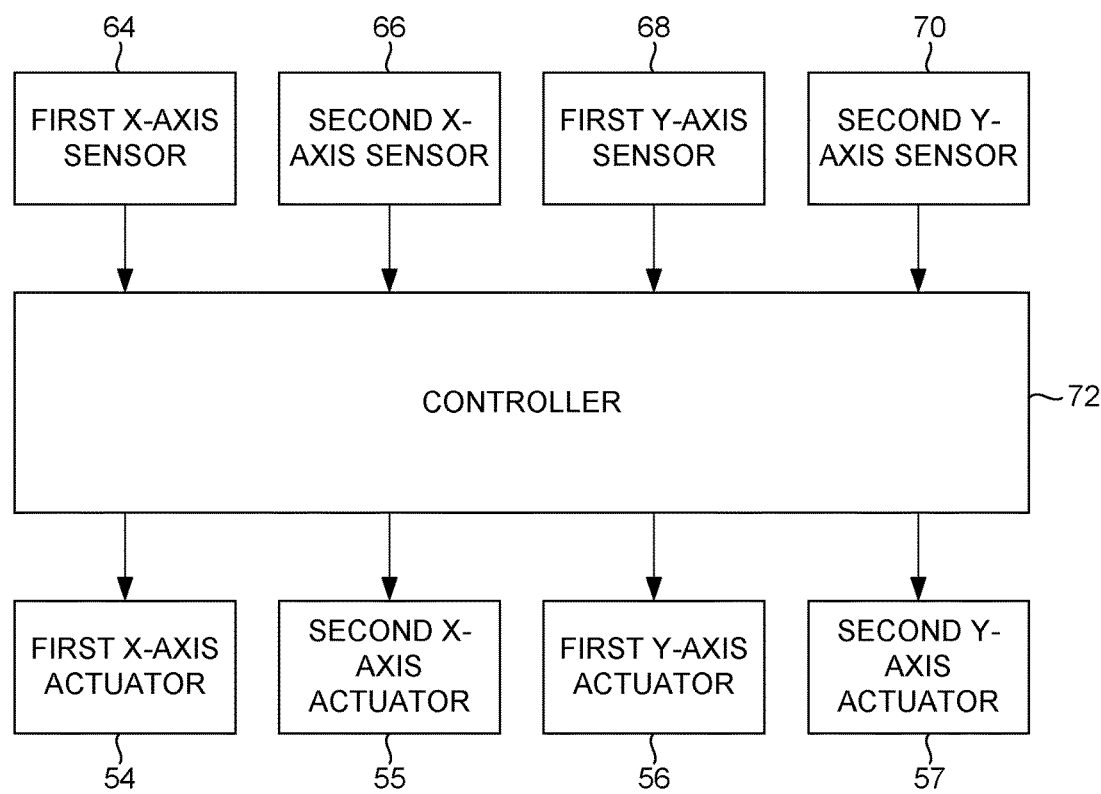
FIG. 7 is a block diagram of a control system of the coating curing unit, in accordance with exemplary embodiments of the invention.

As illustrated in FIG. 7, the control system may include a controller 72 that uses signals from sensors 64-70 as feedback to control actuators 54-57. As the feedback signals represent measurements of displacement of line 46 (FIG. 2) from fiber 30, the feedback signals represent measurements of the extent of alignment between LED curing subsystems 40 and fiber 30. The control system comprising controller 72 and sensors 64-70 thus provides a first linear axis of control perpendicular to the path of fiber 30, a second linear axis of control perpendicular to the first linear axis of control, and a third axis of control that is rotational about the first or second axis of control. Controller 72 may be programmed or otherwise configured in accordance the method described below with regard to FIG. 8.

Figure 8:
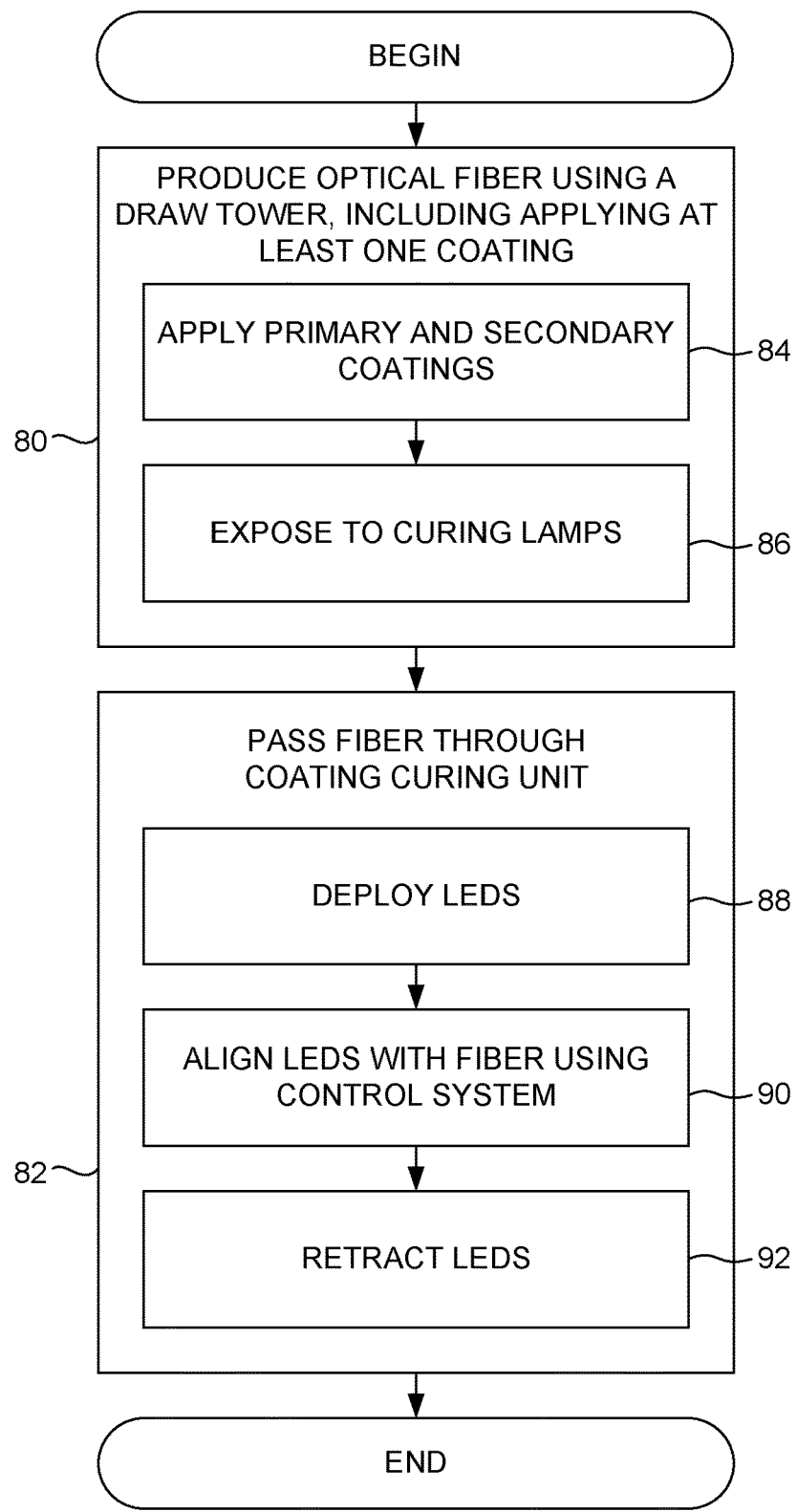
FIG. 8 is a flow diagram illustrating an exemplary method for post-draw tower optical fiber coating curing.

As illustrated in FIG. 8, an exemplary method for producing an optical fiber may broadly include applying at least one coating to the fiber in the draw tower, as indicated by block 80, and passing the fiber through a coating curing unit located along a fiber path between an output end of the draw tower and a fiber takeup system, as indicated by block 82. Although at least one coating is applied, the system and method may nevertheless promote full curing of both a primary coating and a secondary coating in embodiments in which a secondary coating is applied over a primary coating, as indicated by block 84. The coated fiber may be exposed to UV light produced by curing lamps in the draw tower to promote curing, as indicated by block 86. Although the draw tower includes such curing lamps, they may be insufficient by themselves to fully cure the primary coating in high-speed production. Including and operating coating curing unit as described above with regard to FIGS. 1-7 helps ensure that all coatings are fully cured before the fiber is wound on the takeup spool.

The coating curing unit may include LEDs, which may be integrated in one or more LED curing subsystems. The LEDs may be configured or tuned to emit a selected range of wavelengths. More specifically, the LEDs may be configured or tuned to emit UV light concentrated in a range of wavelengths that is absorbed by the secondary coating to a lesser extent than by the primary coating. That is, the secondary coating does not substantially attenuate such UV light, which accordingly passes through the secondary coating to more fully target the primary coating.

A potential problem addressed by the invention is how to initially introduce the fiber into the coating curing unit. Threading the fiber through an enclosed, substantially horizontal space would be difficult. Therefore, the method may include the coating curing unit deploying the LEDs after an initial length of optical fiber has been produced and taken up on the takeup system, as indicated by block 88. That is, a length of fiber drawn from the draw tower initially may proceed to the fiber takeup system before the LEDs are deployed. For example, the LEDs may remain retracted within the coating curing unit's housing until the fiber reaches a threshold speed. As well understood in the art, the speed at which the fiber is drawn is commonly increased or accelerated from zero to a target production speed. When the fiber has reached a threshold speed, the coating curing unit may deploy the LEDs into the fiber path. As the distance between the LEDs and the fiber path may be small, a control system may be employed to provide alignment between the LEDs and the fiber. Deploying the LEDs into the fiber path may provide a coarse initial alignment.

After the LEDs are deployed into the fiber path, the control system may refine the initial or coarse alignment, as indicated by block 90. The control system may move the LEDs in response to feedback signals representing measurements of alignment between the LEDs and the fiber. The control system may be employed once at the beginning of fiber production, and then again at periodic intervals, such as every several minutes or hours, to ensure the LEDs remain aligned with the fiber. Alternatively, the control system may operate essentially continuously during fiber production to ensure the LEDs remain aligned with the fiber. The coating curing unit may retract the LEDs back into its housing when production is finished, i.e., the draw tower is shut down, or at any other time, as indicated by block 92.

Although in the above-described exemplary embodiment coating curing unit 14 is located between the output end of optical fiber draw tower 12 and capstan 36, in other embodiments (not shown) such a coating curing unit may be located between the capstan and the takeup spool. It should be understood that not only are the drawings herein not to scale but the spatial arrangement among elements such as the output end of optical fiber draw tower 12, capstan 36, takeup spool 38, etc., represents only one example. Other arrangements among such elements, including arrangements in which there is sufficient space between the capstan and the takeup spool to locate a coating curing unit, will occur readily to one of ordinary skill in the art in view of the teachings herein.

One or more illustrative or exemplary embodiments of the invention have been described above. However, it is to be understood that the invention is defined by the appended claims and is not limited to the specific embodiments described.

What is claimed is:

1. A system, comprising:
    an optical fiber draw tower having an input end and an output end, the optical fiber draw tower including at least one coating applicator and at least one coating curing lamp; and
    a coating curing unit located along a substantially linear and substantially horizontal fiber path between the output end of the optical fiber draw tower and an optical fiber takeup system, the coating curing unit comprising a plurality of ultraviolet light-emitting diodes (LEDs) linearly arrayed along and parallel to the substantially linear and substantially horizontal fiber path, wherein the coating curing unit includes a plurality of actuators configured to selectively deploy the plurality of LEDs from a retracted position into locations along the fiber path and retract the plurality of LEDs from the locations along the fiber path into the retracted position.

2. The system of claim 1, wherein:
    the optical fiber draw tower includes a primary coating applicator configured to apply a primary coating to an optical fiber and a secondary coating applicator configured to apply a secondary coating over the primary coating; and
    the plurality of LEDs emit energy concentrated in a range of wavelengths absorbed more by the primary coating than the secondary coating.

3. The system of claim 1, wherein the plurality of LEDs are included in a plurality of optically self-contained LED curing subsystems, at least one pair of the LED curing subsystems oriented on opposing sides of the fiber path.

4. The system of claim 1, wherein in the retracted position the plurality of LEDs are located within a housing of the coating curing unit, and in a deployed position the plurality of LEDs are located outside the housing.

5. The system of claim 1, wherein the plurality of LEDs are mounted on a carriage movable in a direction perpendicular to the fiber path.

6. The system of claim 1, wherein the coating curing unit comprises:
    a plurality of sensors configured to measure alignment of the plurality of LEDs with respect to the fiber path; and
    a controller configured to control the actuators to move the plurality of LEDs into the locations along the fiber path in response to a feedback signal representing measurements of alignment of the plurality of LEDs with respect to the fiber path.

7. The system of claim 6, wherein the plurality of sensors and the controller are configured to provide a plural-axis control system.

8. The system of claim 7, wherein a first axis of control of the plural-axis control system is perpendicular to the fiber path, a second axis of control of the plural-axis control system is perpendicular to the first axis, and a third axis of control is rotational about one of the first and second axes.

9. A system, comprising:
    an optical fiber draw tower having an input end and an output end, the optical fiber draw tower including at least one coating applicator and at least one coating curing lamp; and
    a coating curing unit located along a fiber path between the output end of the optical fiber draw tower and an optical fiber takeup system, the coating curing unit including a plurality of ultraviolet light-emitting diodes (LEDs) and a plurality of actuators configured to selectively deploy the plurality of LEDs from a retracted position into locations along the fiber path and retract the plurality of LEDs from the locations along the fiber path into the retracted position.

\* \* \* \* \*